United States Patent
Baek

(10) Patent No.: US 12,439,221 B2
(45) Date of Patent: Oct. 7, 2025

(54) DEVICE AND METHOD OF CALCULATING INDOOR/OUTDOOR SEAMLESS POSITIONING ON BASIS OF DATA FUSION AND COMMON MESSAGE FORMAT IN MULTIMODAL TRANSPORTATION

(71) Applicant: JastecM CO., LTD., Gyeonggi-do (KR)

(72) Inventor: Yongbeom Baek, Gyeonggi-do (KR)

(73) Assignee: JastecM CO., LTD., Gyeonggi-do (KR)

( * ) Notice: Subject to any disclaimer, the term of this patent is extended or adjusted under 35 U.S.C. 154(b) by 125 days.

(21) Appl. No.: 17/412,391

(22) Filed: Aug. 26, 2021

(65) Prior Publication Data
US 2023/0047714 A1   Feb. 16, 2023

(30) Foreign Application Priority Data
Aug. 12, 2021   (KR) .......... 10-2021-0106579

(51) Int. Cl.
| | |
|---|---|
| H04W 4/02 | (2018.01) |
| G06F 18/25 | (2023.01) |
| H04L 1/00 | (2006.01) |
| H04W 4/029 | (2018.01) |
| H04W 4/33 | (2018.01) |
| H04W 4/38 | (2018.01) |

(52) U.S. Cl.
CPC .......... *H04W 4/023* (2013.01); *G06F 18/251* (2023.01); *H04L 1/0061* (2013.01); *H04W 4/029* (2018.02); *H04W 4/33* (2018.02); *H04W 4/38* (2018.02)

(58) Field of Classification Search
None
See application file for complete search history.

(56) References Cited

U.S. PATENT DOCUMENTS

2019/0213285 A1*  7/2019  Baggeroer ........ G06F 16/90335
2022/0360550 A1*  11/2022  Gupta ............... H04L 51/066

* cited by examiner

*Primary Examiner* — Frantz Bataille
(74) *Attorney, Agent, or Firm* — The PL Law Group, PLLC

(57) ABSTRACT

A device of calculating indoor/outdoor seamless positioning on the basis of a common message format according to an embodiment may include a domain provided with a sensor for detecting a moving subject and configured to generate sensing data, a positioning domain configured to receive the sensing data from the domain and perform data fusion or sensor fusion. A method of calculating indoor/outdoor seamless positioning on the basis of the common message format according to an embodiment may include entering, by a moving subject, a detection range of a sensor provided in a domain, generating, by the sensor, sensing data necessary to calculate positioning of the moving subject, transmitting the sensing data to a positioning domain that performs data fusion or sensor fusion of the sensing data, and generating, by the positioning domain, a common message format of the sensing data for seamless positioning of the moving subject.

9 Claims, 5 Drawing Sheets

FIG. 3

```
100  110
 $Baud rate: 9600 System clock: 24.553 MHz
 $GPGGA,114455.532,3735.0079,N,12701.6446,E,1,03,7.9,48.8,M,19.6,M,0,0.0000*48
 $GPGSA,A,2,19,25,15,........,21.5,7.9,20.0*32          130
 $GPGSV,3,1,10,03,86,244,00,19,51,218,38,16,51,057,00,07,40,048,00*77    140
 $GPGSV,3,2,10,13,34,279,00,23,33,236,00,15,29,076,40,25,25,143,38*71
 $GPGSV,3,3,10,10,21,18,051,,27,12,315*77
 $GPRMC,114455.532,A,3735,.0079,N,12701.6446,E,0.000000,121.61.110706,*0A
 <CR><LF>
 121 122        150
  120
```

DEVICE AND METHOD OF CALCULATING INDOOR/OUTDOOR SEAMLESS POSITIONING ON BASIS OF DATA FUSION AND COMMON MESSAGE FORMAT IN MULTIMODAL TRANSPORTATION

CROSS REFERENCE TO RELATED APPLICATION

The present application claims priority to Korean Patent Application No. 10-2021-0106579, filed Aug. 12, 2021, the entire contents of which is incorporated herein for all purposes by this reference.

BACKGROUND

1. Field of the Invention

The present invention relates to a device and method of calculating indoor/outdoor seamless positioning on the basis of data fusion between different sensors and a common message format.

2. Description of the Related Art

The market demand is increasing for a technology that may secure indoor positioning data of a moving subject and seamlessly link the indoor positioning data with outdoor positioning data such as walking or driving.

In order for high-level autonomous driving technology to be put to practical use, it is imperative to secure high-precision positioning calculation technology that ensures provision of highly reliable positioning despite changes in external environment.

SUMMARY

In the present invention, a sensor provided in one domain transmits and receives not only information on position, speed, time, and the like of a moving subject, but also information on a case when the moving subject moves between different domains, whereby seamless positioning that is accurate and highly reliable may be calculated.

In a device of calculating indoor/outdoor seamless positioning on the basis of a common message format of the present invention, the device includes: a domain provided with a sensor for detecting a moving subject and configured to generate sensing data; and a positioning domain configured to receive the sensing data from the domain and perform data fusion or sensor fusion, wherein the positioning domain may generate a common message format for the sensor fusion.

In a method of calculating indoor/outdoor seamless positioning on the basis of a common message format, the method includes: a first step of entering, by a moving subject, a detection range of a sensor provided in a domain; a second step of generating, by the sensor, sensing data necessary to calculate positioning of the moving subject; a third step of transmitting the sensing data to a positioning domain that performs data fusion or sensor fusion of the sensing data; and a fourth step of generating, by the positioning domain, a common message format of the sensing data for the seamless positioning of the moving subject.

When the moving subject moves while switching positioning between indoors and outdoors, the calculation of accurate positioning of the moving subject may be performed by data fusion or sensor fusion of sensors included in domains.

Data fusion may take place by a single sensor, or may take place by two or more sensors. For example, sensor fusion may mean fusion of each detected sensing datum between sensors different from each other, and in this case, data fusion may be a combination of information of different sensors having different data formats.

In addition, the present invention may provide a standard of a predictable time or range of accurate positioning with a single sensor even in worst conditions including a severe situation in which sensor fusion is not possible. In a case of such a single sensor, the meaning of data fusion may be a combination of sensing data detected by the single sensor.

In the exemplary embodiment, sensing data detected by the single sensor may include, according to a time difference, first sensing data and second sensing data, and the data fusion means a combination of the first sensing data and the second sensing data. Therefore, for example, the data fusion by the single sensor may mean calculating the second sensing data through at least one process of learning, verification, and determination, which are based on the first sensing data collected in the past.

A positioning domain PTD may use a common message format between sensors belonging to different domains, and reduce the complexity of calculation by using the common message format, so that the time taken for the calculation may be shortened.

The present invention may improve positioning accuracy and reliability by utilizing two or more various environment sensors. Data fusion or sense fusion may be performed between sensors different from each other, and the load on a central processor including CPU and MCU may be reduced by the data fusion or the sense fusion.

The common message format may mean a common structure of a message input for calculating indoor/outdoor seamless positioning, and may mean encryption of data in an encoding method. The positioning domain PTD may unify the data transmitted from different types of sensors into the common structure.

BRIEF DESCRIPTION OF THE DRAWINGS

FIG. 3 is a view illustrating an exemplary embodiment of the common message format of the present invention.

DETAILED DESCRIPTION

Figure 1:
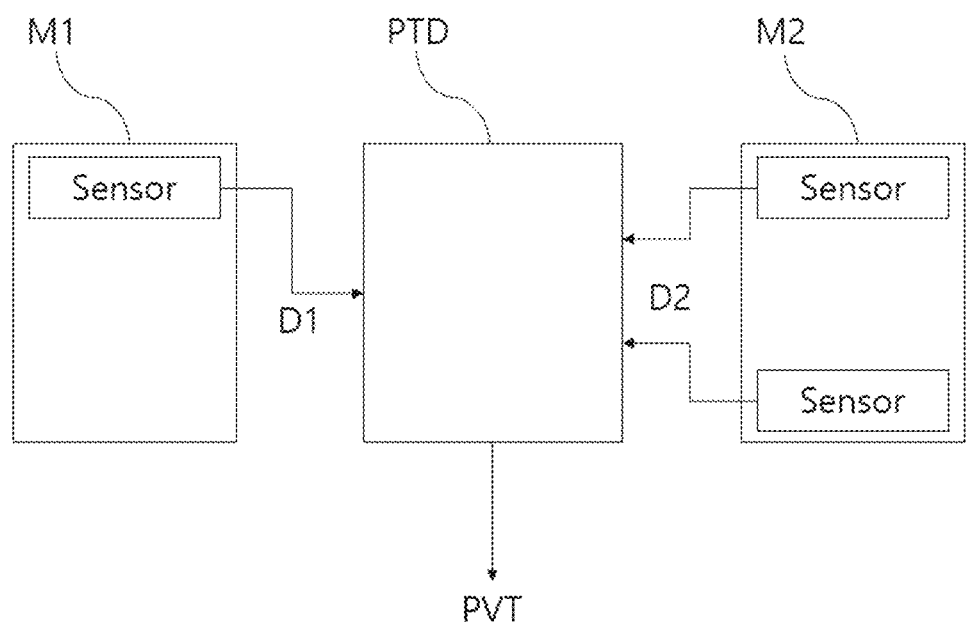
FIG. 1 is a view illustrating a positioning domain of the present invention.
Figure 2:
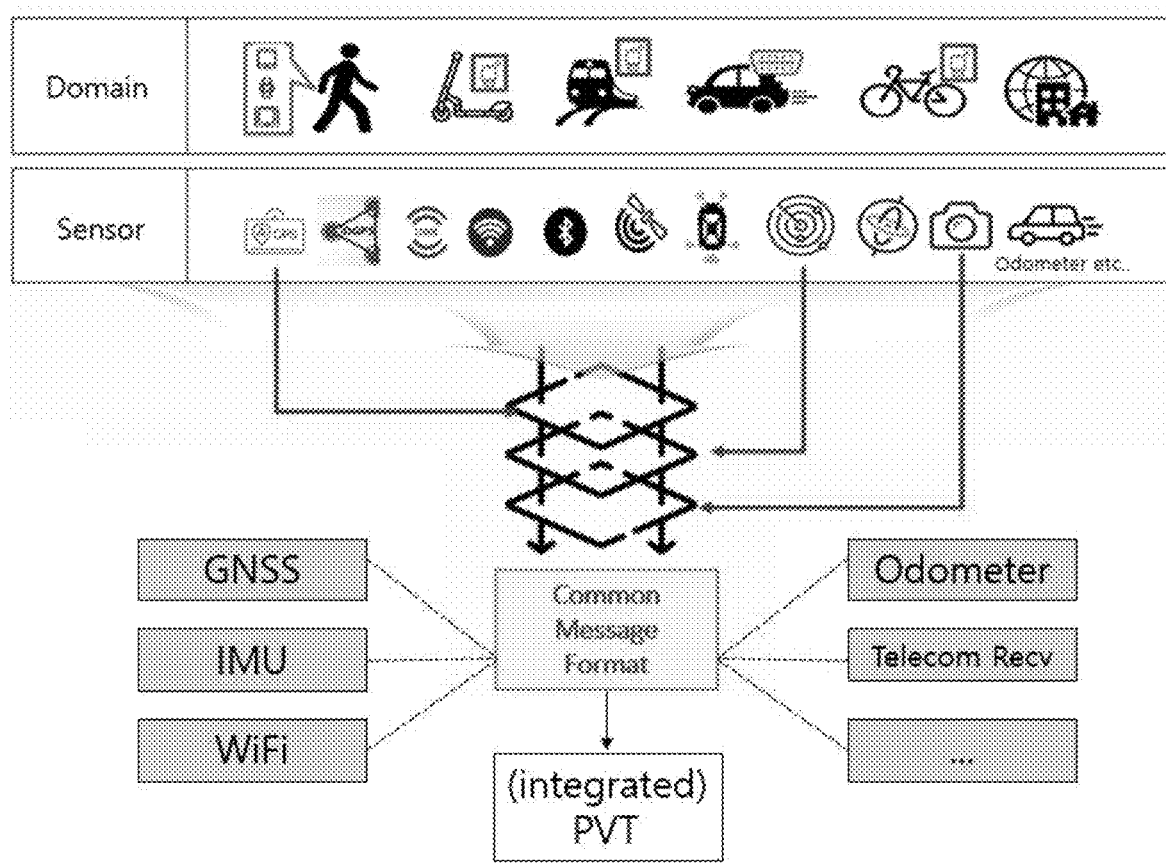
FIG. 2 is a view illustrating a relationship between domains, sensors, and a common message format of the present invention.
Figure 4:
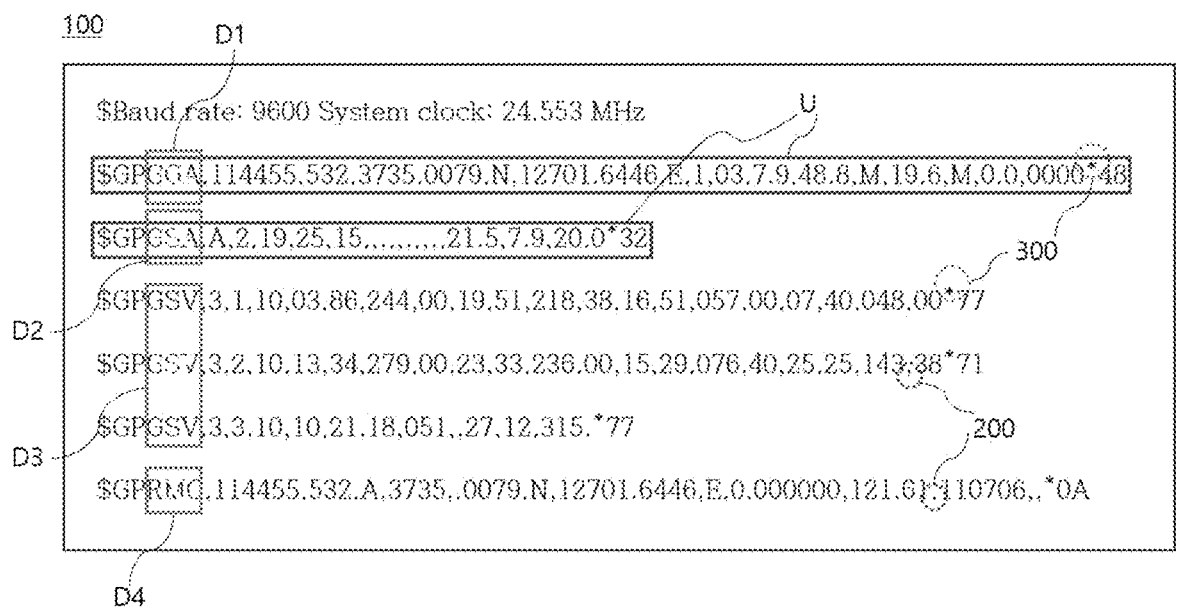
FIG. 4 is a view illustrating another exemplary embodiment of a common message format of the present invention.
Figure 5:
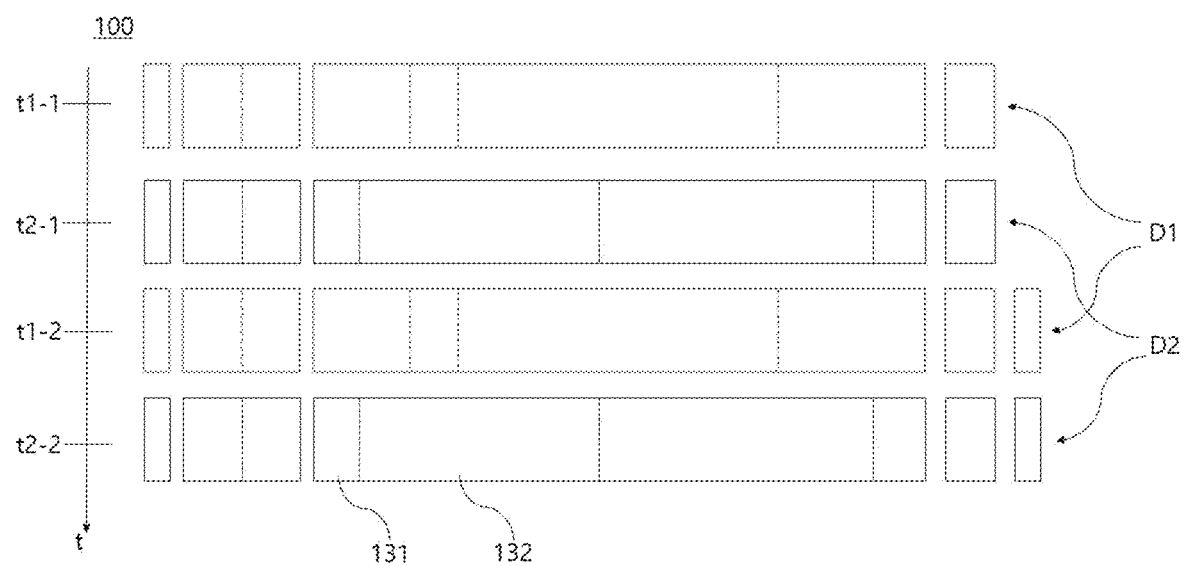
FIG. 5 is a view illustrating sensor fusion between different sensing data according to a flow of time of the present invention.

The present invention may be to improve a problem of a satellite-centered positioning method, and may provide seamless positioning between indoors and outdoors. The present invention may utilize data fusion or sensor fusion, and a common message format of available environment sensors including GPS, IMU, camera, Lidar, and Bluetooth. Accordingly, the load on a central processor, including CPU or microcontroller unit (MCU), is reduced so that data utilization and system efficiency may be increased.

According to position movement of a moving subject including a person, the present invention may calculate indoor/outdoor seamless positioning through continuous position information exchange between domains that include mobility.

The present invention may fuse environment recognition sensors such as IMU, camera, Lidar, radar, and odometer, in addition to GPS, which use an inertial navigation method independent of radio wave reception situation. Even though absolute position measurement is impossible due to variable environmental factors, two or more sensor signals are fused for indoors and outdoors and a common message format is used, so as to increase speed, continuity, accuracy, and reliability of positioning technology using relative positions, whereby the precision of positioning may be dramatically increased.

Accurate positioning calculation of a moving subject may be performed by various sensors. In particular, when the moving subject moves while switching positioning between indoors and outdoors, the accurate positioning calculation of the moving subject may be performed by sensor fusion of a plurality of sensors included in domains. The positioning calculation may include position, velocity, and time.

Data fusion may take place by a single sensor, or may take place by two or more sensors. For example, sensor fusion may mean fusion of each detected sensing datum between sensors different from each other, and in this case, data fusion may be a combination of information of different sensors having different data formats.

In addition, the present invention may provide a standard of a predictable time or range of accurate positioning with a single sensor even in worst conditions including a severe situation in which sensor fusion is not possible. In a case of such a single sensor, the meaning of data fusion may be a combination of sensing data detected by the single sensor.

In the exemplary embodiment, the sensing data detected by the single sensor may include, according to a time difference, first sensing data and second sensing data, and data fusion means a combination of the first sensing data and the second sensing data. Therefore, for example, the data fusion by the single sensor may mean calculating the second sensing data through at least one process of learning, verification, and determination, which are based on the first sensing data collected in the past.

The moving subject may be a person or a domain. For example, when a person rides a mobility including a vehicle, an IoT domain may be the moving subject.

The domain may mean a unit or an area to which a sensor for collecting data necessary to calculate positioning of the moving subject may be attached.

The moving subject may enter within a detection range of a sensor provided in a domain. The sensor may generate sensing data required to calculate positioning of the moving subject. The sensing data may be transmitted to a positioning domain PTD that performs sensor fusion of the sensing data. That is, the positioning domain PTD may perform the sensor fusion or data fusion between different sensors in order to continuously calculate the positioning of the moving subject. The positioning domain PTD may generate a common message format 100 for the sensor fusion or data fusion.

A sensor may include any device capable of collecting data necessary for positioning calculation. The sensor may include: a global navigation satellite system (GNSS), global positioning system (GPS), Lidar, camera, radar, inertial measurement unit (IMU), WiFi, magnetometer, telecom received signal strength indication (Recv), or odometer.

When a moving subject switches positioning by moving between indoors and outdoors, sensor fusion may take place wherein data of each sensor belonging to a plurality of domains is collected. That is, before calculating the final positioning of the moving subject, the sensor data belonging to the plurality of domains may be transmitted to the positioning domain PTD.

The positioning domain PTD may use the collected sensing data to complete the sensor fusion for calculating the final positioning, or may calculate the final positioning of the moving subject.

When the plurality of sensing data is transmitted to a positioning domain PTD in each individual format, calculation of positioning or completing sensor fusion may be very complex and take a long time.

Therefore, the positioning domain PTD may use a common message format 100 between sensors belonging to different domains, and reduce the complexity of calculation by using the common message format 100, so that the time taken for the calculation may be shortened.

Accordingly, the common message format 100 may mean a common structure of a message input for calculating indoor/outdoor seamless positioning, and may mean encryption of data in an encoding method. The positioning domain PTD may unify the data transmitted from different types of sensors into the common structure.

Sensing data may be detected by a sensor of a specific domain according to movement of a moving subject, which is an object of positioning calculation, the sensing data may be transmitted to a positioning domain PTD, and the sensing data according to the movement of the moving subject may be collected by the positioning domain PTD.

The positioning domain PTD may designate a block according to the type of sensing data when the sensing data is transmitted. The common message format 100 may include a plurality of blocks. The plurality of blocks may include: a start block 110, an end block 150, a sensor block 120, a data block 130, and a checksum block 140.

The positioning domain PTD may designate the start block 110 when first sensing data arrives, and may designate the end block 150 when the transmission of the first sensing data is completed. When a moving subject enters a sensing range, the first sensor may generate the first sensing data, and in this case, the start block 110 may also be designated. When the moving subject is out of the sensing range of the first sensor, the first sensing data may be ended, and in this case, an end block 150 may also be designated. For example, the start block 110 may be indicated by "$", and the end block 150 may be indicated by "<CR> <LF>".

That is, the marks indicating the plurality of blocks that include the start blocks 110 and the end blocks 150 are merely an example for convenience of description, and may not be limited thereto.

The sensor block 120 may include a first sensor block 121 and a second sensor block 122.

The first sensor block 121 may include information on the type of sensors. For example, sensing data transmitted from GPS may be displayed as GP.

The second sensor block 122 may include information on the type of transmitted data. For example, the data transmitted from GPS may include various data including: data about a satellite that provides data; and data about time, date, position, route, and speed. A second sensor block 122 may be used to enable the transmitted sensing data to be specified as each distinct piece of information, and a third sensor block and a fourth sensor block may be additionally generated when necessary to distinguish the sensing data.

Accordingly, the sensor block 120 may identify the sensing data distinguished by the first sensor block 121 and the second sensor block 122. For example, when at least one of the first sensor block 121 and the second sensor block 122 has a different value, the sensing data may be identified as different one.

The data block 130 may include substantial information about the moving subject. For example, the data block 130 may include various data such as longitude, latitude, path, speed, magnetic change, direction, altitude, or azimuth of the moving subject. For example, the data block 130 may include a first data block 131 and a second data block 132, wherein the first data block 131 and the second data block 132 may include identifying information about the moving subject, the information including position, speed, and time.

For example, the data block 130 may include a first data block to a fifth data block. The first data block may include information on positions of the moving subject, the second data block may include information on speed of the moving subject, the third data block may include information on time of the moving subject, the fourth data block may include information on longitude of the moving subject, and the fifth data block may include information on latitude of the moving subject. For example, actual information of the first to fifth data blocks may be expressed by ASCII codes or binary-encoding.

A positioning domain PTD may generate a delimiter 200 that distinguishes a recognizable unit of transmitted data. The delimiter 200 may be arranged between different blocks to distinguish the blocks from each other, and may be inserted within a block when data indicates different information. For example, when data on longitude, latitude, and altitude of the moving subject is included in the data block 130, the delimiter 200 may be inserted between data indicating the longitude, latitude, and altitude. For example, the delimiter 200 may be expressed as ",", and "A,B" may be referred to as that data between block A and block B is null.

The positioning domain PTD may perform block-packaging, in units of one day, sensing data detected by a sensor every sampling time.

The sensing data unit U may be referred to as information on a moving subject for each sampling time of each sensor. The sensing data unit U may be identified by an end character 300. Each sensing data unit U may include a start block 110, and may be ended by the end character 300. That is, the number of start blocks 110 may be the same as the number of sensing data units U, and one piece of sensing data may have one end block 150. The end character 300 may be represented as, for example, "*".

A checksum block 140 may perform checksum, which is one of redundancy checks performed for error correction of data on a transmission side and on a reception side. For example, the checksum block 140 may perform an exclusive OR operation on all data that exists between the end character 300 and the start block 110. When the checksum block 140 performs the exclusive OR operation between transmitted data and received data, the block on which the operation is performed may be the data block 130.

Sensors that generate different types of sensing data by the sensor block 120 may be referred to as a first sensor and a second sensor. The first sensor may generate first sensing data at every first sampling time, and the second sensor may generate second sensing data at every second sampling time. The first sampling time and the second sampling time may be different time intervals.

The sensing data detected by the first sensor at 1-1 sampling time may be referred to as 1-1 sensing data, and the sensing data detected by the first sensor at 1-2 sampling time may be referred to as 1-2 sensing data. The sensing data detected by the second sensor at 2-1 sampling time may be referred to as 2-1 sensing data, and the sensing data detected by the second sensor at 2-2 sampling time may be referred to as 2-2 sensing data.

The 1-1 sensing data, 1-2 sensing data, 2-1 sensing data, and 2-2 sensing data may be referred to as a sensing data unit U used by the positioning domain PTD for sensor fusion.

When each sensor transmits sensing data to a positioning domain PTD in an individual format, there may be many limitations in collecting data transmitted by each sensor. For example, when the information detected by each sensor is sequentially collected and compared with each other over time, it may be difficult to compare the information in order in which the sensing data is generated because each sensing data format between the sensors is different. In addition, when the information collected by each sensor is compared with each other during a predetermined time period, the number of sampling times of each sensor included in the predetermined time period may be different, whereby the possibility of generating errors in positioning calculation may increase.

In the present invention, information may be collected in a common message format between sensors belonging to different domains, whereby sensing data may be sequentially arranged in order according to a flow of time. Therefore, the common message format of the present invention may immediately allow sensing data fusion to be performed between different types of sensing data, and positioning may be calculated with higher accuracy than when sensing data is collected in an individual format.

A domain may include: a personal domain, an IoT domain, an infrastructure domain, and a positioning domain PTD. A cloud server capable of transmitting and receiving data required for calculating both a domain and positioning may be provided.

Domains that are different from each other may be referred to as a first domain M1 and a second domain M2, and the first domain M1 and the second domain M2 may be one of the personal domain, IoT domain, infrastructure domain, and positioning domain PTD.

A subject performing a personal domain may be a device that is always carried by a moving user and transmits position data through a mobile communication network.

A subject performing an IoT domain may be a vehicle or an e-mobility service provider, providing a vehicle means.

A subject performing an infrastructure domain may be a public or private facility management organization. A location of infrastructure or surrounding traffic data may be transmitted to other domains.

The positioning domain PTD may provide indoor/outdoor seamless positioning. It is possible to provide an indoor/outdoor seamless PVT (Position, Velocity, Timing) service through sensor fusion between each sensor, and through data exchange with a cloud server.

By using sensor fusion that performs the indoor/outdoor seamless positioning and collecting sensing data, the positioning domain PTD may calculate positioning of the moving subject or complete sensor fusion before calculating the final positioning.

What is claimed is:
1. A device of calculating seamless positioning, the device comprising:

a domain provided with a sensor for detecting a moving subject and configured to generate sensing data, the domain comprising:
: a personal domain performed by a device that is carried by a moving user;
: an IoT domain performed by a vehicle or an e-mobility service provider; and
: an infrastructure domain performed by a public or private facility management organization, the infrastructure domain configured to transmit a location of infrastructure or surrounding traffic data;
a positioning domain configured to receive the sensing data from each of the personal domain, the IoT domain and the infrastructure domain and perform sensor fusion,
wherein the positioning domain generates a common message format for the sensor fusion,
wherein the sensor fusion is a combination of the sensing data from the personal domain, the IoT domain and the infrastructure domain, or a combination of the sensing data having a time difference generated by a single sensor of the personal domain, the IoT domain or the infrastructure domain;
wherein the common message format is identified by sensing data unit that is a unit of processing of the sensor fusion; and
the positioning domain processes the sensing data unit transmitted in time order.

2. The device of claim 1, wherein the common message format comprises a start block, a sensor block, a data block, a checksum block, and an end block;
the common message format begins with the start block and ends with the end block;
the checksum block performs checking and correcting errors occurred between transmission and reception of the sensing data;
the start block is arranged at a front end of the sensing data unit;
the checksum block is arranged at a rear end of the sensing data unit;
the sensor block comprises a first sensor block and a second sensor block, each indicating a type of the sensor or a type of the information detected by the sensor;
the first sensor block and the second sensor block identify the sensing data according to the type of information detected by the sensor;
overall arrangement and length of the data block are determined according to identification of the sensor block;
the data block is provided in a plurality of data blocks;
the plurality of data blocks comprises information including location, speed, and time for the moving subject;
the information of the data block is provided in ASCII codes or binary-encoding; and
the start block, the sensor block, the data block, and the end block are arranged in order in the common message format.

3. The device of claim 1, wherein a start block and an end block, which are included in the common message format, are generated when the sensing data is transmitted;
the common message format begins with the start block and ends with the end block; and
the start block is arranged at a front end of the sensing data unit.

4. The device of claim 1, wherein a sensor block configured to distinguish different sensing data is generated;
the common message format comprises the sensor block;
the sensor block comprises a first sensor block and a second sensor block; and
in the different sensing data, the sensing data is distinguished as different from each other when at least one of the first sensor block and the second sensor block is different.

5. The device of claim 1, wherein the sensor comprises a first sensor and a second sensor;
the first sensor generates first sensing data;
the second sensor generates second sensing data
the first sensing data comprises 1-1 sensing data and 1-2 sensing data each having an interval of a first sampling time, wherein the 1-1 sensing data is sensing data detected by the first sensor at 1-1 sampling time, and the 1-2 sensing data is sensing data detected by the first sensor at 1-2 sampling time;
the second sensing data comprises 2-1 sensing data and 2-2 sensing data each having an interval of a second sampling time, wherein the 2-1 sensing data is sensing data detected by the second sensor at 2-1 sampling time, and the 2-2 sensing data is sensing data detected by the second sensor at 2-2 sampling time;
the positioning domain generates the common message format in time order in which the first sensing data and the second sensing data are transmitted;
the first sampling time and the second sampling time are different from each other; and
the positioning domain performs the sensor fusion in order of the 1-1 sensing data, the 2-1 sensing data, the 1-2 sensing data, and the 2-2 sensing data when the first sensing data and the second sensing data are simultaneously transmitted to the positioning domain.

6. The device of claim 1, wherein a data block comprising information on the moving subject is generated;
a sensor block for distinguishing the sensing data is generated;
the common message format comprises the data block and the sensor block;
the data block has a different number of data blocks according to a type of the sensing data;
the number of data blocks is determined by the sensor block; and
a delimiter character separating the different data blocks is arranged between the different data blocks.

7. The device of claim 1, wherein a start block arranged at a front end of the common message format is generated;
a checksum block configured to perform redundancy check for correcting errors occurred between transmission and reception of the sensing data is generated;
a data block comprising the information on the moving subject is generated;
the common message format comprises the start block, the data block, and the checksum block;
an end character indicating an end of the data block is arranged at a rear end of the data block; and
the checksum block performs an exclusive OR operation on all data between the end character and the start block.

8. A method of calculating seamless positioning, the method comprising:
a first step of entering, by a moving subject, a detection range of a sensor provided in a domain, the domain comprising:
: a personal domain performed by a device that is carried by a moving user;

an IoT domain performed by a vehicle or an e-mobility service provider; and an infrastructure domain performed by a public or private facility management organization, the infrastructure domain configured to transmit a location of infrastructure or surrounding traffic data;

a second step of generating, by the sensor, sensing data necessary to calculate positioning of the moving subject;

a third step of transmitting the sensing data from the personal domain, the IoT domain and the infrastructure domain to a positioning domain that performs sensor fusion of the sensing data; and a fourth step of generating, by the positioning domain, a common message format of the sensing data for the seamless positioning of the moving subject, wherein the sensor fusion is a combination of the sensing data from the personal domain, the IoT domain and the infrastructure domain, or a combination of the sensing data having a time difference generated by a single sensor of the personal domain, the IoT domain or the infrastructure domain;

wherein the common message format is identified by sensing data unit that is a unit of processing of the sensor fusion; and the positioning domain processes the sensing data unit transmitted in time order.

9. The method of claim 8, wherein the fourth step comprises a step of identifying the common message format by sensing data unit that is a unit of processing of the sensor fusion;

the positioning domain generates the sensing data unit in time order in which the sensing data is transmitted to the positioning domain;

a first sensor and a second sensor respectively generate first sensing data and second sensing data, the first sensor and the second sensor respectively belonging to different domains;

first sensing data unit, which is one of the sensing data unit adjacent according to the time order, belongs to the first sensing data; and second sensing data unit, which is the other of the sensing data unit, belongs to the second sensing data.

* * * * *